United States Patent [19]
Kato

[11] Patent Number: 5,632,430
[45] Date of Patent: May 27, 1997

[54] MATERIAL FEEDING APPARATUS

[75] Inventor: Heizaburo Kato, Shizuoka-ken, Japan

[73] Assignee: Sankyo Seisakusho Co., Tokyo, Japan

[21] Appl. No.: 494,819

[22] Filed: Jun. 26, 1995

[30] Foreign Application Priority Data

Mar. 17, 1995 [JP] Japan ................... 7-058763

[51] Int. Cl.$^6$ ............ B65H 23/06; B65H 20/00
[52] U.S. Cl. ........................... 226/149; 226/165
[58] Field of Search ................... 226/128, 149, 226/165, 162

[56] References Cited

U.S. PATENT DOCUMENTS

| | | | |
|---|---|---|---|
| 3,485,430 | 12/1969 | Scribner | 226/162 X |
| 3,613,980 | 10/1971 | Kulig et al. | 226/162 |
| 3,791,567 | 2/1974 | Schott, Jr. | 226/149 X |
| 3,963,161 | 6/1976 | Jerney et al. | 226/162 X |
| 3,980,297 | 9/1976 | Bulso, Jr. et al. | |
| 4,819,850 | 4/1989 | Kato | 226/162 |
| 4,848,636 | 7/1989 | Kato | 226/149 X |
| 4,926,274 | 5/1990 | Saitoh et al. | |

FOREIGN PATENT DOCUMENTS 517141  4/1988  Japan.

*Primary Examiner*—Michael Mansen
*Attorney, Agent, or Firm*—Harness, Dickey & Pierce, P.L.C.

[57] ABSTRACT

A material feeding apparatus intermittently feeds a material having a relatively large width at high speed with high accuracy, whereby adjustment of the apparatus and the die maintenance can be readily performed, and the material will not be easily damaged. The material feeding apparatus includes a pair of gripper feeds which are provided on both the right and left sides of a press machine and actuated synchronously. Each of the gripper feeds comprises first gripper which can clamp and release the material, second gripper which reciprocatably moves along a direction of material conveyance to the first gripper and which can clamp and release the material, and cam for repeating such operations that, when the second gripper clamps the material at a conveyance start position, the first gripper means releases the material, and when the second gripper moves to a conveyance finish position, the first gripper clamps the material while the second gripper releases the material and returns to the conveyance start position.

5 Claims, 11 Drawing Sheets

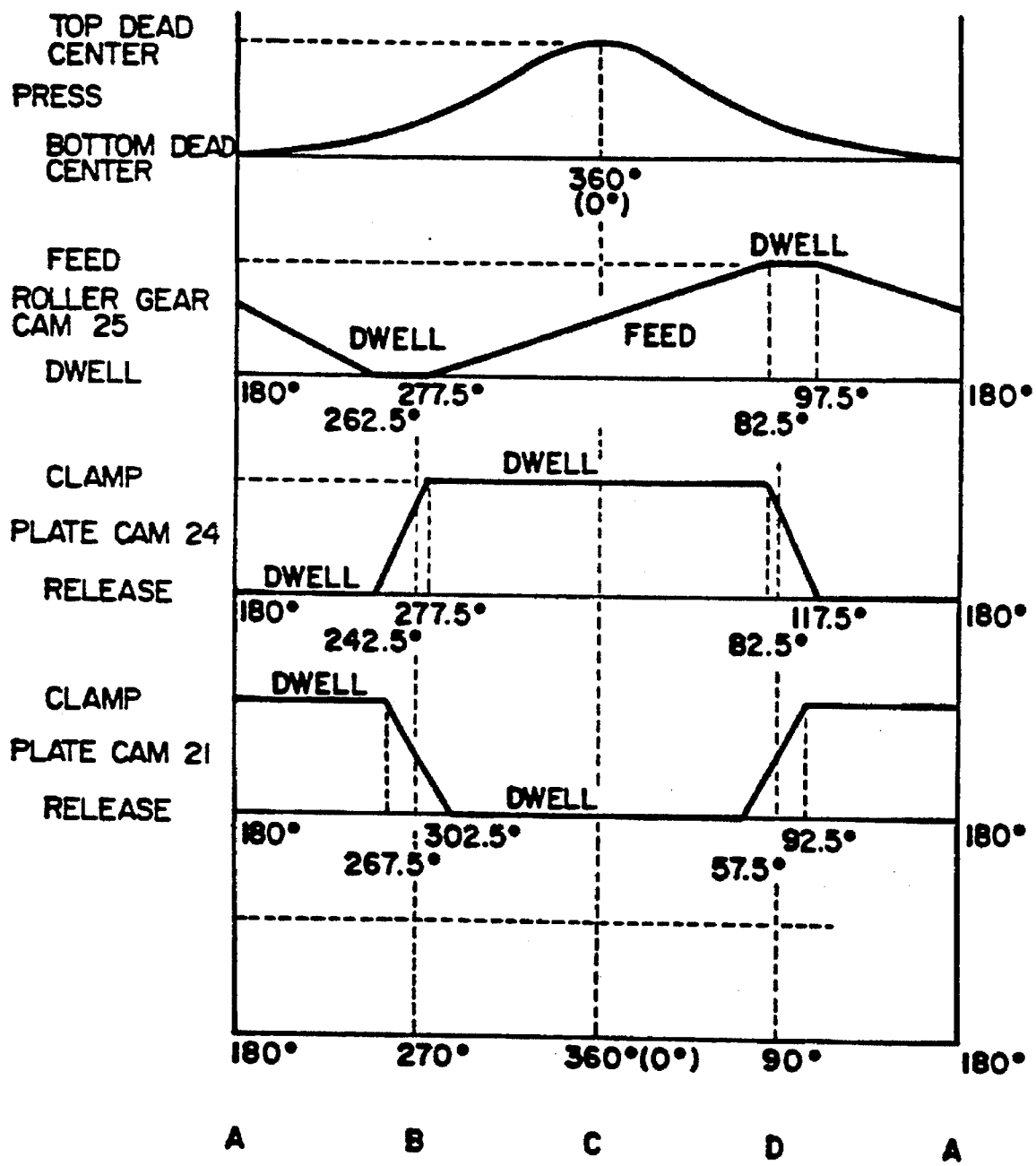

| GRIPPER FEED | DIE |
|---|---|
| 180° MATERIAL CLAMPED 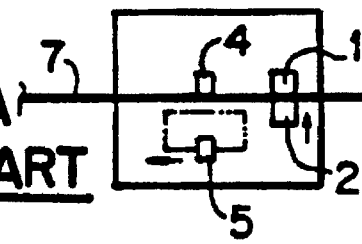 FIG. 7A PRIOR ART | BOTTOM DEAD CENTER PRESS COMPLETED 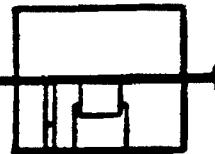 |
| 270° RETURN FINISHED 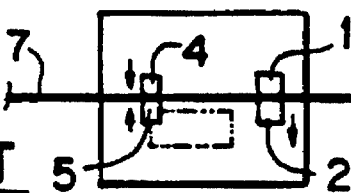 FIG. 7B PRIOR ART | PRESS RAISED 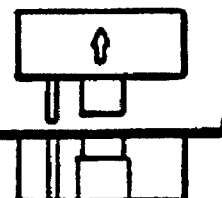 |
| 0° MATERIAL BEING FED 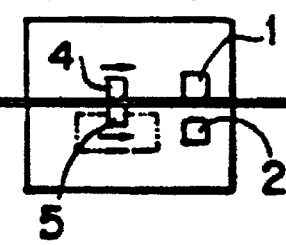 FIG. 7C PRIOR ART | TOP DEAD CENTER 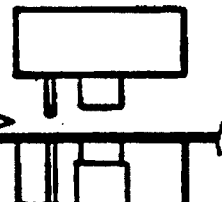 |
| 90° FEED FINISHED 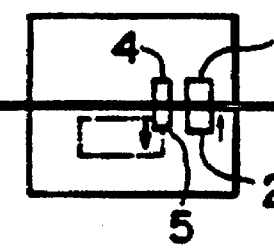 FIG. 7D PRIOR ART | PRESS BEING LOWERED 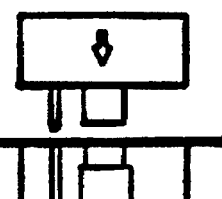 |

MATERIAL FEEDING APPARATUS

BACKGROUND OF THE INVENTION

The present invention relates to a material feeding apparatus for conveying sheet materials or a continuous strip material from a coil, which have a relatively large width, into a working machine such as a press machine.

FIG. 10 shows a conventional apparatus for intermittently feeding a continuous strip material from a coil, which has a relatively large width, into a die set in a press machine or the like. This is a roll feed system in which rolls 201, 202 having a large length are timingly driven by intermittent drive means 203, and a continuous strip material 204 is inserted between the two rolls 201, 202 and conveyed. As another conventional example, a sheet feeding system is shown in FIG. 11. In the sheet feeding system, dogs 305 (or fingers) for positioning sheet materials 304 are spacedly provided, at equal intervals, on a chain conveyer 303, and the chain conveyer 303 is intermittently operated by intermittent drive means 301 and sprockets 302, so as to deliver the sheet materials 304.

However, in the conventional feeding apparatus with the rolls of the large length, the shape and the strength of the long rolls make it difficult to adjust parallelism of the rolls; and a diameter of the rolls and the index number of the intermittent drive means must be changed to accurately control the feeding length. In consequence, the apparatus is increased in size and restricts the working space on the front side of the die, so that it is difficult to make access to the die for maintenance. Also, the conventional chain-conveyer type feeding apparatus occupies even more space than the roll feed system, and the die maintenance is more difficult. Further, since the dogs are employed, high-speed conveyance can not be achieved. Similarly, when fingers are employed, the conveyance speed is limited. Thus, exactly synchronized operation can not be effected. There coherently arises a problem that the material is easily damaged by the dogs or fingers.

This invention has been achieved to solve the above-described conventional problems. It is an object of the invention to provide a material feeding apparatus which can intermittently feed a material having a relatively large width at high speed, whereby adjustment of the apparatus and the die maintenance can be readily performed, and the material will not be easily damaged.

SUMMARY OF THE INVENTION

In order to achieve the above object, according to the present invention, there is provided a material feeding apparatus including a pair of gripper feeds which are provided on both the right and left sides of a material introducing portion of a working machine and actuated synchronously, the gripper feeds each comprising: first gripper means which have a stationary gripper and a movable gripper which can clamp and release a material; second gripper means which reciprocatably move along a direction of material conveyance to the first gripper means, the second gripper means having a stationary gripper and a movable gripper which can clamp and release the material; and cam means for repeating such operations that, when the second gripper means clamp the material at a conveyance start position, the first gripper means release the material, and when the second gripper means move to a conveyance finish position, the first gripper means clamp the material while the second gripper means release the material and return to the conveyance start position. Pairs of such gripper feeds may be provided on both the material introducing portion on the front side and a material discharging portion on the rear side of the working machine.

With the above-described structure of the invention, a continuous strip material from a coil which has a relatively large width can be clamped at both the right and left sides and fed into the working machine, so that the space for the apparatus can be reduced. The pair of right and left gripper feeds are separated from each other to allow the operator to stand therebetween and to perform the die maintenance easily. The shape and surface accuracy of the grips is improved not to damage the material. Moreover, since the pair of right and left gripper feeds are actuated synchronously by the cam means, high-speed feeding operation can be performed with high accuracy. Furthermore, when pairs of gripper feeds are provided both on the front and rear sides of the working machine, sheet materials of a relatively large width can be fed similarly.

BRIEF DESCRIPTION OF THE DRAWINGS

FIG. 6 is a timing chart illustrative of the operation of the embodiment of the invention; including the gripper feed of prior art construction.

FIGS. 7A–D are process diagrams illustrative of the operation of the embodiment of the invention including the gripper feed of a prior art construction;

DETAILED DESCRIPTION OF THE PREFERRED EMBODIMENTS

Figure 1:
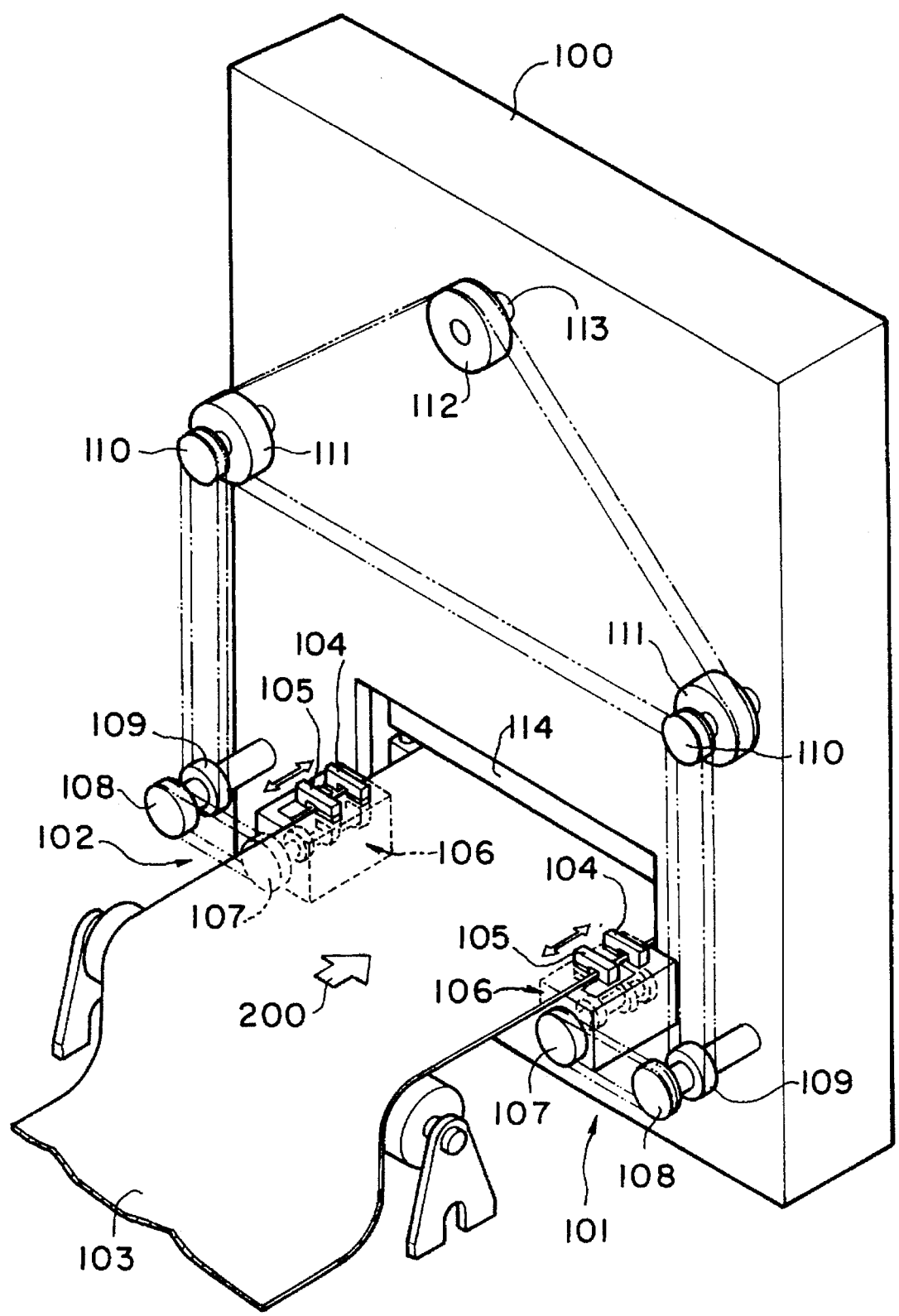
FIG. 1 is a perspective view schematically showing one embodiment of a material feeding apparatus according to the present invention.

FIG. 1 shows one embodiment of a material feeding apparatus according to the present invention. A pair of gripper feeds 101, 102 are provided on both the right and left sides of a material introducing portion of a press machine 100, as viewed in a direction of material conveyance indicated by the arrow 200. The right and left gripper feeds 101, 102 are located symmetrically, and each comprises first gripper means 104 which include a stationary gripper and a movable gripper which can clamp and release both sides of a continuous strip material 103 from a coil which has a relatively large width, and second gripper means 105 which reciprocatably move along the material conveyance direction to the first gripper means 104, the second gripper means 105 including a stationary gripper and a movable gripper which can clamp and release both sides of the continuous strip material 103. Each of the gripper feeds 101, 102 further includes cam means 106 for repeating the following operation: When the second gripper means 105 clamp the continuous strip material 103 at a conveyance start position, the first gripper means 104 release the continuous strip material 103, and when the second gripper means 105 move to a conveyance finish position, the first gripper means 104 clamp the continuous strip material 103, and the second gripper means 105 release the continuous strip material 103 and return to the conveyance start position. The cam means 106 are driven by drive pulleys 107. The drive pulleys 107 are connected to a crankshaft 113 of the press machine 100 through intermediate pulleys 108, 109, 110 and sprockets 111, 112 which are arranged symmetrically on both the right and left sides, and the drive pulleys 107 are driven synchronously by the crankshaft 113. The crankshaft 113 drives an upper half of a die 114 through connecting rods and slides (not shown), thereby press-working the continuous strip material 103.

Figure 2:
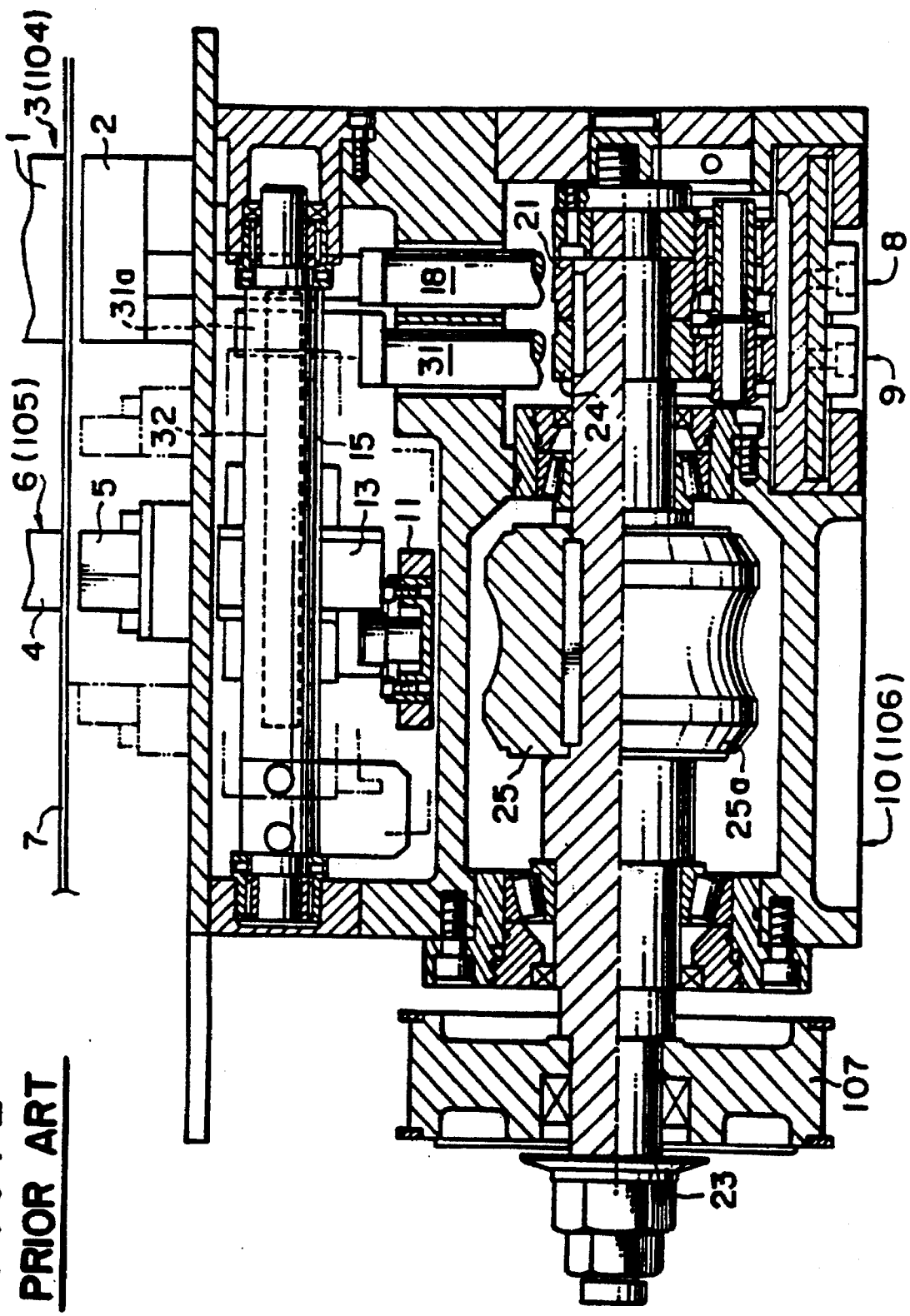
FIG. 2 is a front cross-sectional view schematically showing a gripper feed of a prior art construction, as employed in this embodiment of the invention.
Figure 3:
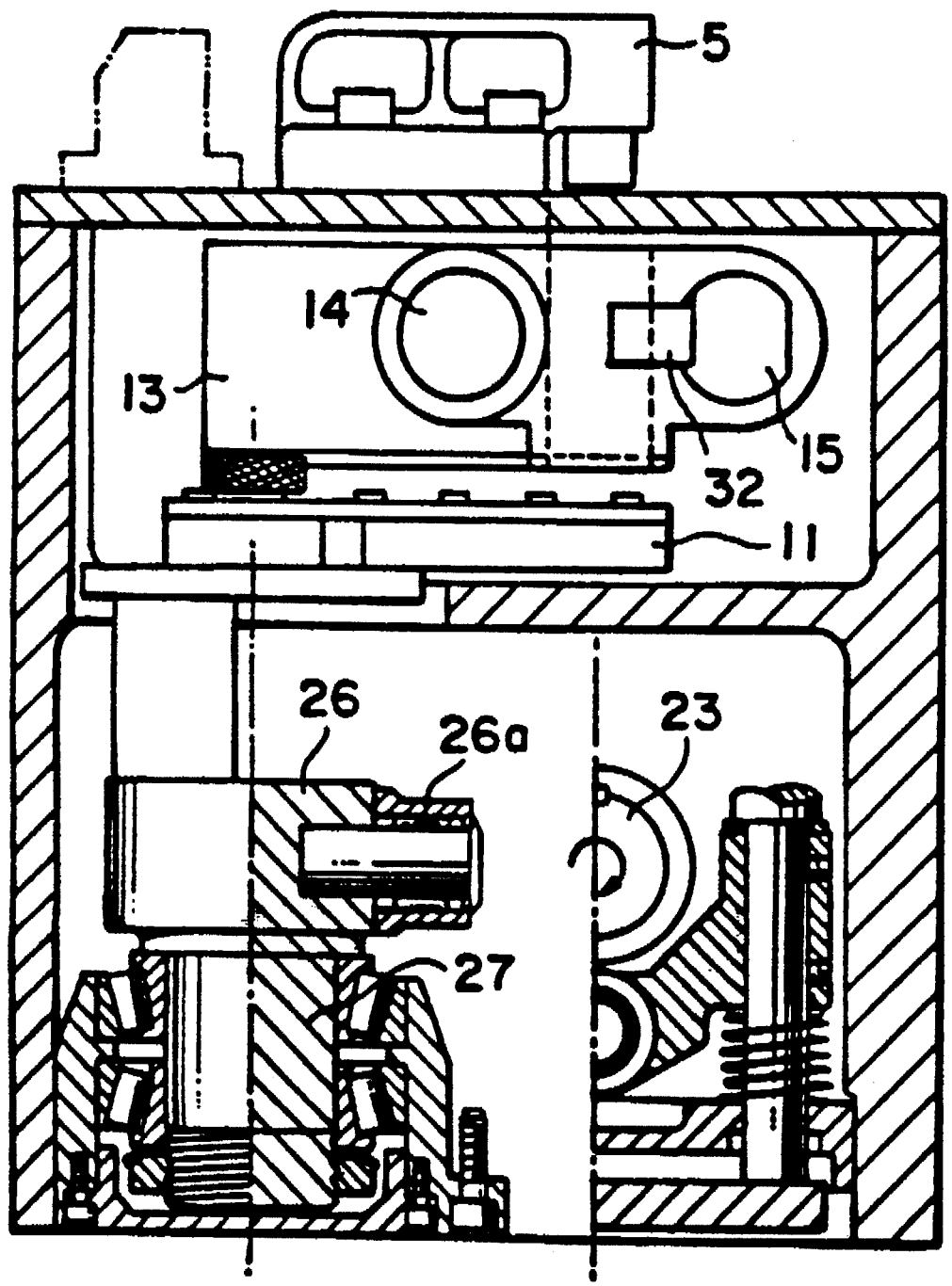
FIG. 3 is a left-side cross-sectional view schematically showing the gripper feed of FIG. 2.
Figure 4:
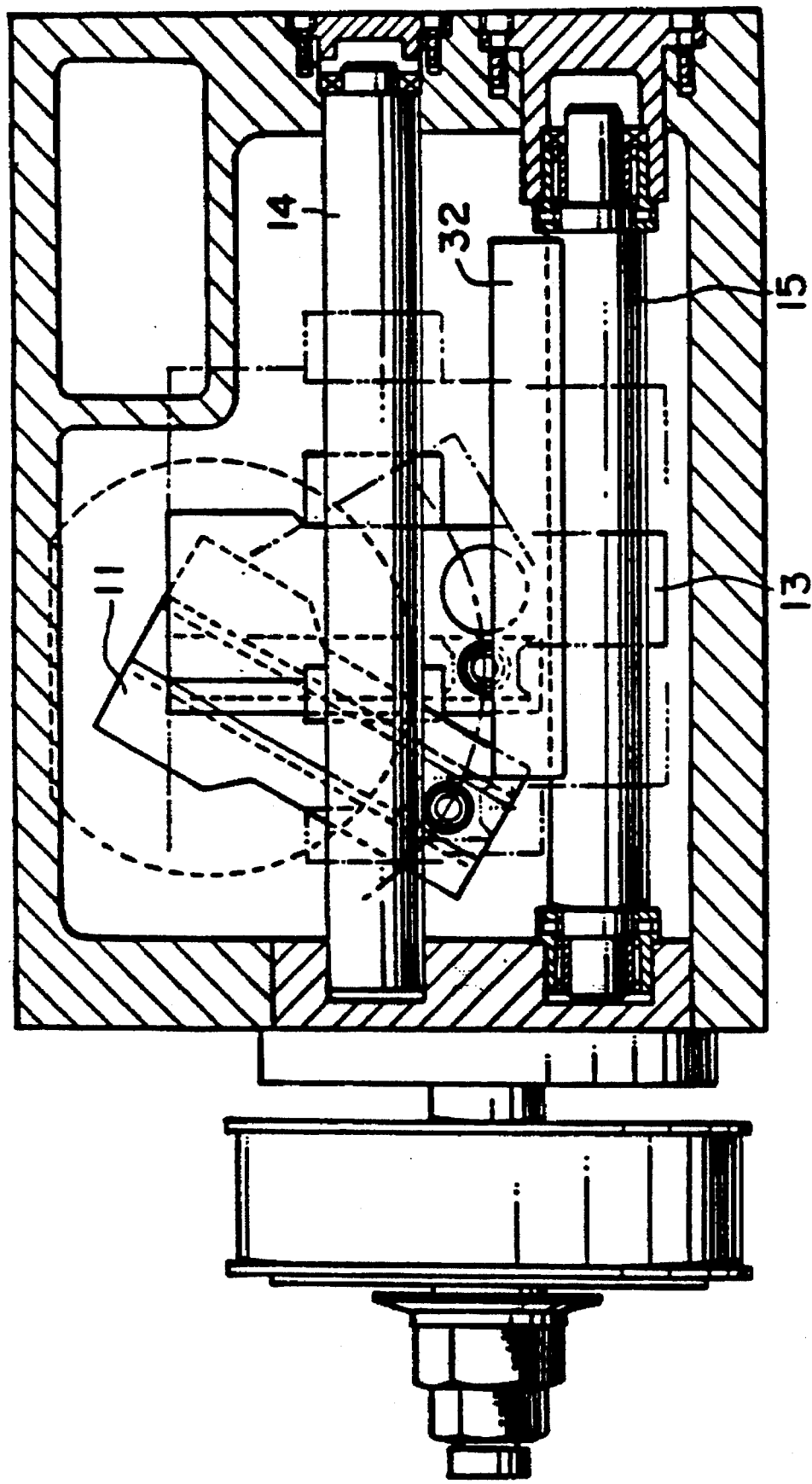
FIG. 4 is a horizontal cross-sectional view schematically showing the gripper feed of FIG. 2.
Figure 5:
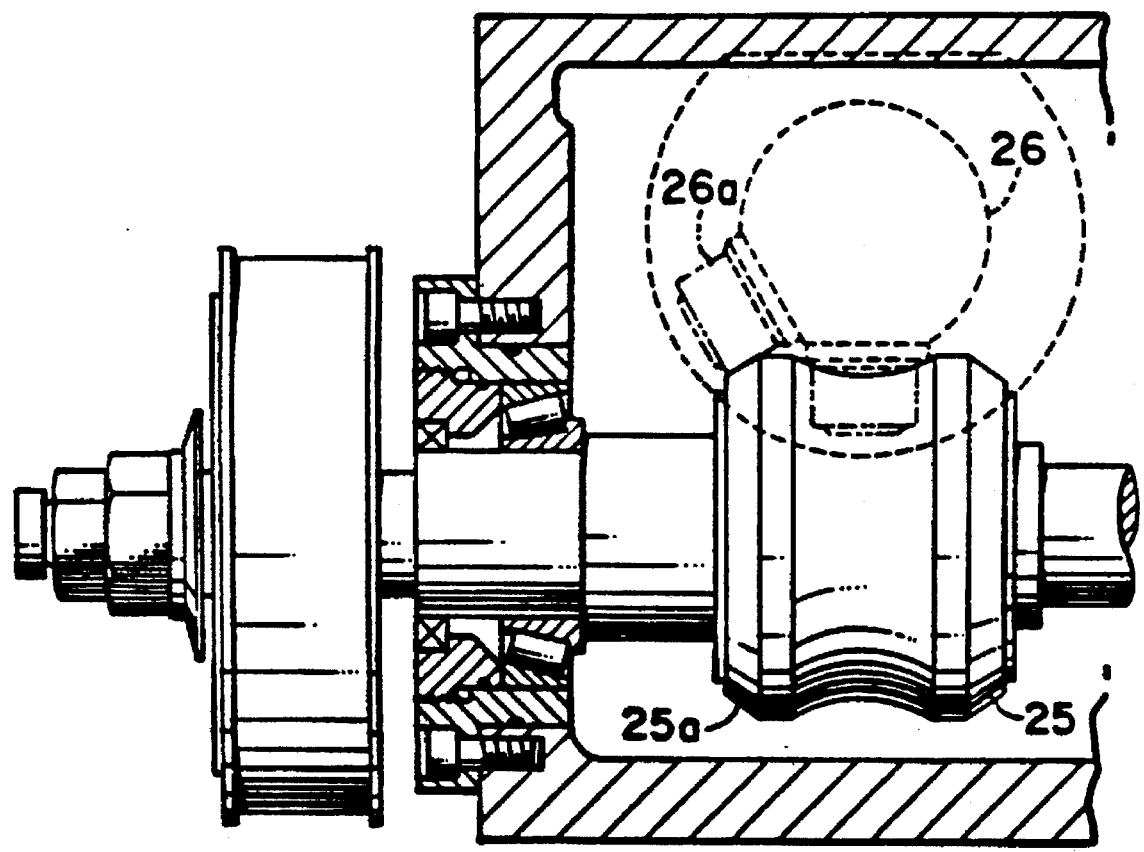
FIG. 5 is another horizontal cross-sectional view schematically showing the gripper feed of FIG. 2, taken along a different plane.

The gripper feeds 101, 102 in this embodiment will now be described more specifically. The structure of the gripper feeds 101, 102 is based on a material feeding apparatus disclosed in Japanese Patent Examined Publication No. 5-17141, for Japanese Application No. 61-224297 which corresponds to U.S. Pat. Nos. 4,819,850, 4,883,210 and 4,967,619. The content of this publication is incorporated in one part of the content of the specification of the present invention, and the following description will be given correspondingly to the disclosure of the publication. FIG. 2 is a front cross-sectional view schematically showing the gripper feed 101, 102, FIG. 3 is a schematic left-side cross-sectional view of the same, FIG. 4 is a schematic horizontal cross-sectional view of the same, and FIG. 5 is another horizontal cross-sectional view schematically showing this gripper feed, taken along a different plane. The gripper feed 101, 102 comprises first gripper means 3 (104) which clamp and release a material 7 between a first stationary gripper 1 and a first movable gripper 2, second gripper means 6 (105) which clamp and release the material 7 between a second stationary gripper 4 and a second movable gripper 5, the second gripper means 6 (105) being provided on a sliding block 13 which reciprocatably slide along a material conveyance passage and located opposite to the first gripper means 3 (104), first gripper operating means 8 including a first actuator 18 which is movable between a clamping position for moving the first movable gripper 2 close to the first stationary gripper 1 and a releasing position for moving the first movable gripper 2 away from the first stationary gripper 1, second gripper operating means 9 including a second actuator 31 which is movable between a clamping position for moving the second movable gripper 5 close to the second stationary gripper 4 and a releasing position for moving the second movable gripper 5 away from the second stationary gripper 4, and cam means 10 (106) which are continuously rotated in one direction. The cam means 10 (106) comprise first and second plate cams 21, 24 which respectively interlock with the first and second actuators 18, 31 and move them between the clamping position and the releasing position at a predetermined timing, a roller gear cam 25 which converts a continuous rotating motion into a rotatably swinging motion of a rotatably swinging axis 27, and a single input axis 23 extending horizontally to rotate the first and second plate cams 21, 24 and the roller gear cam 25. A drive pulley 107 is fixed on the input axis 23. Side surfaces of taper ribs of the roller gear cam 25 on opposite sides serve as cam surfaces 25a. A plurality of rolling cam followers 26a protruded from the periphery of a turret 26 are in rolling contact with the cam surfaces 25a. When the roller gear cam 25 is rotated with the input axis 23, the cam surfaces 25a and the rolling cam followers 26a function to swingingly rotate the turret 26 and the rotatably swinging axis 27 in accordance with the shape of the cam surfaces 25a. On the other hand, a swingable arm 11 interlocking with the sliding block 13 is provided on the rotatably swinging axis 27, so that the sliding block 13 reciprocatingly slides at a predetermined timing in response to the rotatably swinging motion of the rotatably swinging axis 27. The second gripper means 9 include a rotating shaft 15 provided with a working part 32 for operating the second movable gripper 5, the rotating shaft 15 being fitted on the sliding block 13 to be swingingly rotatable. When rotated in one direction, the rotating shaft 15 causes the second movable gripper 5 to move close to the second stationary gripper 4 through the working part 32. When rotated in the other direction, the rotating shaft 15 causes the second movable gripper 5 to move away from the second stationary gripper 4 through the working part 32. The second gripper means 9 further include a spring (not shown) which constantly urges the rotating shaft 15 in one direction, and control means (not shown) for controlling a force of this spring. The second actuator 31 has an engaging portion 31a which engages with the working part 32, and is movable between the releasing position for rotating the rotating shaft 15 in the second direction against the force of the spring and the clamping position for rotating the rotating shaft 15 in the first direction by the force of the spring.

Next, the operation of each of the gripper feeds 101, 102 will be described. The input axis 23 of the cam means 10 (106) is rotated through the drive pulley 107, and accordingly, the first and second cams 21, 24 and the roller gear cam 25 integral with the input axis 23 are rotated. Consequently, the first movable gripper 2 of the first gripper means 3 (104) and the second movable gripper 5 of the second gripper means 6 (105) are operated at a predetermined timing, and the second stationary gripper 4 and the second movable gripper 5 of the second gripper means 6 (105) together with the sliding block 13 are slid along the material conveyance direction at a predetermined timing, thereby conveying the material 7. The timing will now be described with reference to FIGS. 6 and 7A–D. FIG. 6 is a timing chart of the plate cams 21, 24, the roller gear cam 25 and the press machine 100, and FIGS. 7A–D is a process diagram illustrative of the operations of the material feeding apparatus and the die corresponding to timings A, B, C and D of FIG. 6. First, at the timing A, the first movable gripper 2 is raised, and the material 7 is clamped between the first stationary and movable grippers 1 and 2. However, the second movable gripper 5 is located at a lower position, with the material 7 being in an unclamped state between the second stationary and movable grippers 4 and 5 which are on the way back to the conveyance start position. In this state, the input axis 23 continues to be rotated, and the second movable gripper 5 is returned to the conveyance start position and subsequently raised to clamp the material 7 whereas the first movable gripper 2 is lowered to release the material 7. This is the timing B. Thereafter, at the timing C, the second stationary and movable grippers 4 and 5 which clamp the material 7 are being moved in the material conveyance direction. Then, the second stationary and movable grippers 4 and 5 are moved to the conveyance finish position, and the material 7 is fed by a length corresponding to a distance of the movement of these grippers. This is the timing D. When the conveyance of the material 7 is finished, the first movable gripper 2 is raised to clamp the material 7. After that, the second movable gripper 5 is lowered to release the material 7, and the second stationary and movable grippers 4 and 5 are moved in a direction reverse to the material conveyance direction and returned to the position of the timing A. Then, while the input axis 23 is continuously rotated, the above-described cycle is repeated to convey the material 7 intermittently by a predetermined length at a time. Obviously, clamping and releasing of the material 7 and its conveyance at the foregoing timings can be easily conducted by suitably designing the shapes of the first and second cams 21, 24 and the roller gear cam 25 of the cam means 10 (106). Further, as clearly understood from the above description, the timings A, B, C and D are arranged to prevent the material 7 from being completely unclamped and free, i.e., to prevent the first gripper means 3 (104) and the second gripper means 6 (105) from both releasing the material 7, for the entire period of operation of the material feeding apparatus. Thus, it is possible to prevent feeding accuracy of the material 7 from being deteriorated by the force of inertia and so forth, to thereby enable highly accurate material feeding. Moreover, in this embodiment, the first cam 21 operates the first movable gripper 2 through the first gripper operating means 8, and the second cam 24 operates the second movable gripper 5 through the second gripper operating means 9. Since the first and second movable grippers 2 and 5 are thus operated by components different from each other, the components for operation at the above-described timings can be designed easily.

Figure 8:
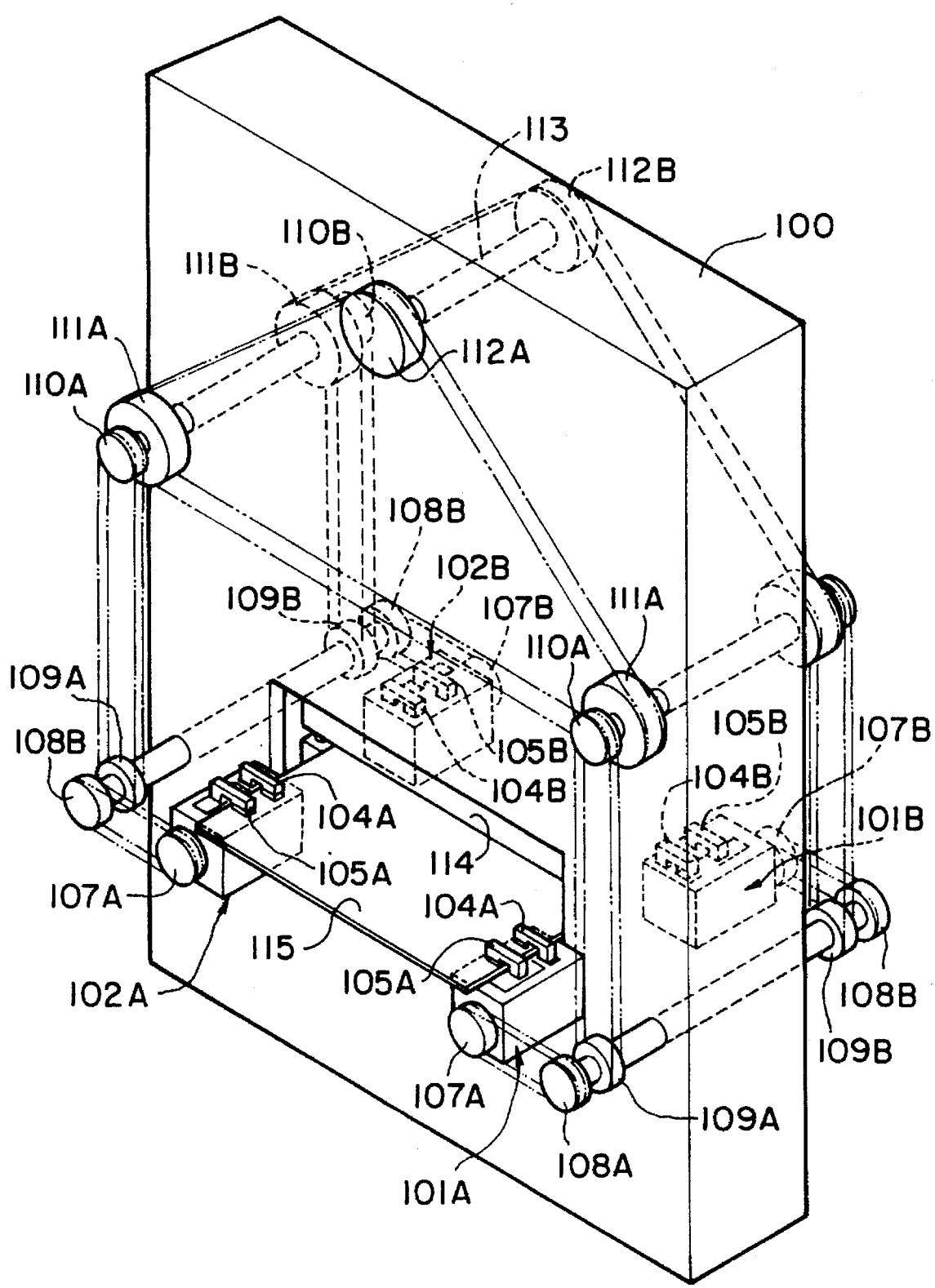
FIG. 8 is a perspective view schematically showing another embodiment of a material feeding apparatus according to the invention.
Figure 9:
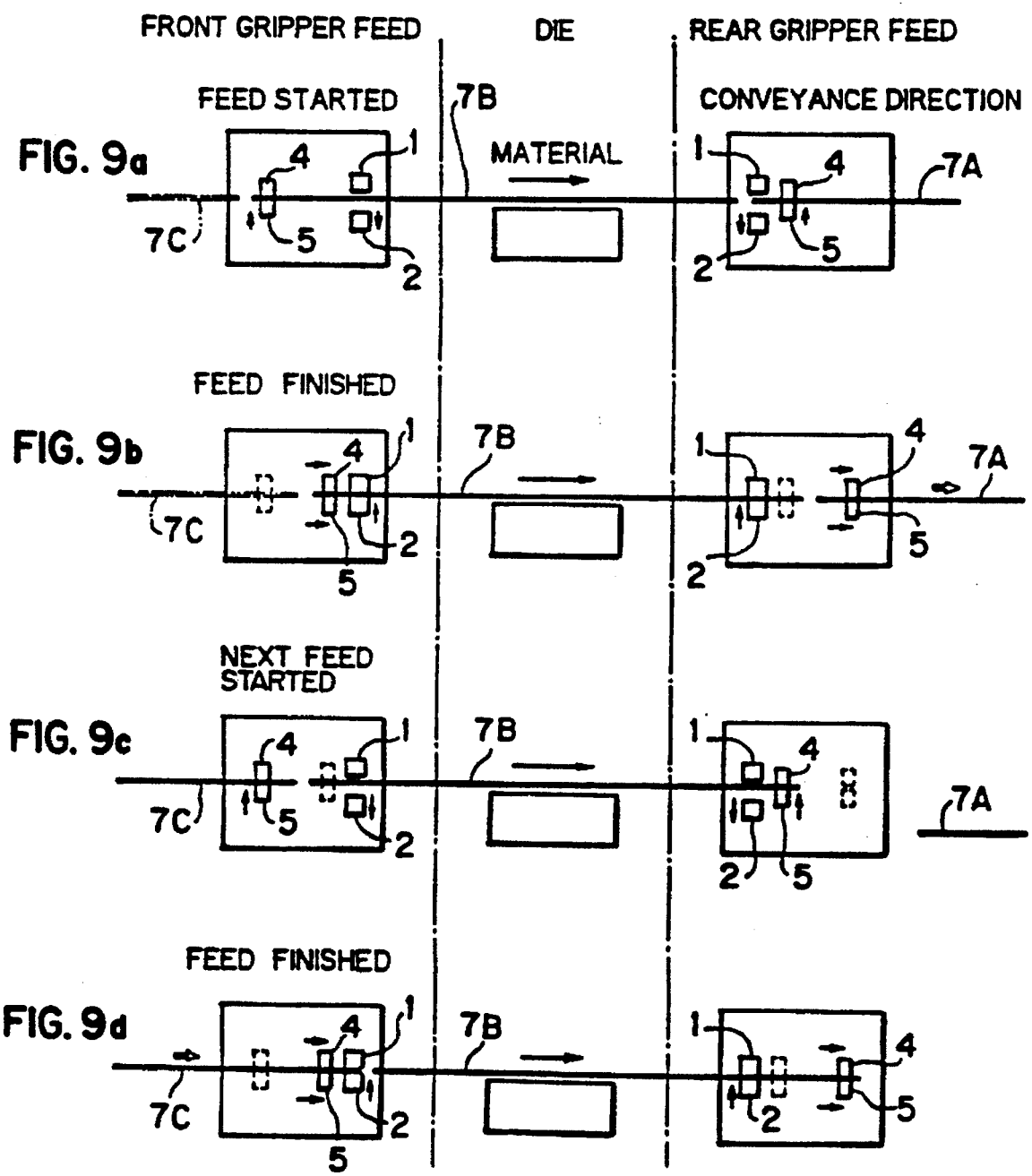
FIGS. 9a–d are process diagrams illustrative of the operation of this embodiment of the invention including the gripper feed of a prior art construction.
Figure 10:
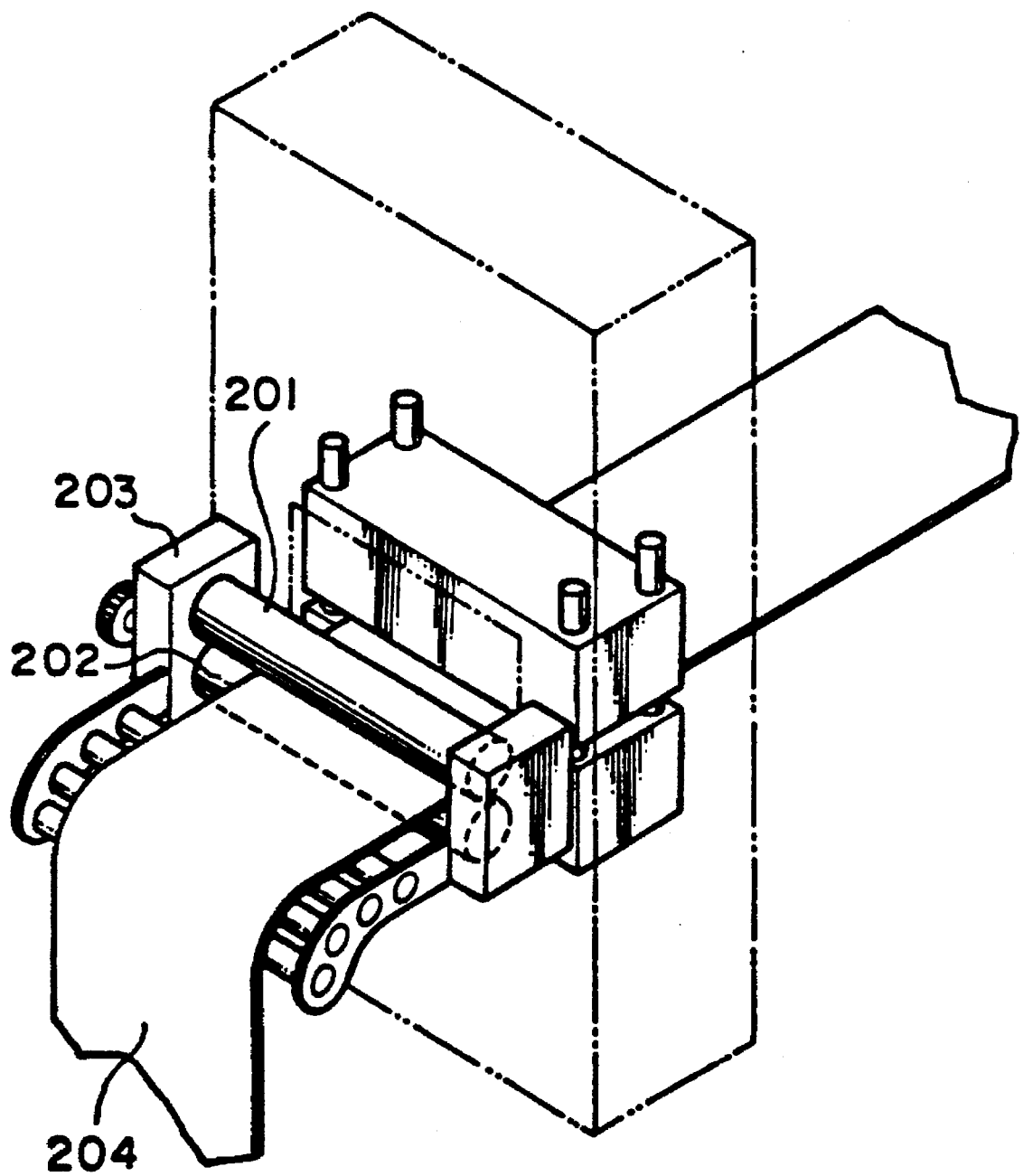
FIG. 10 is a perspective view schematically showing a prior art of a material feeding apparatus for a continuous strip material from a coil.
Figure 11:
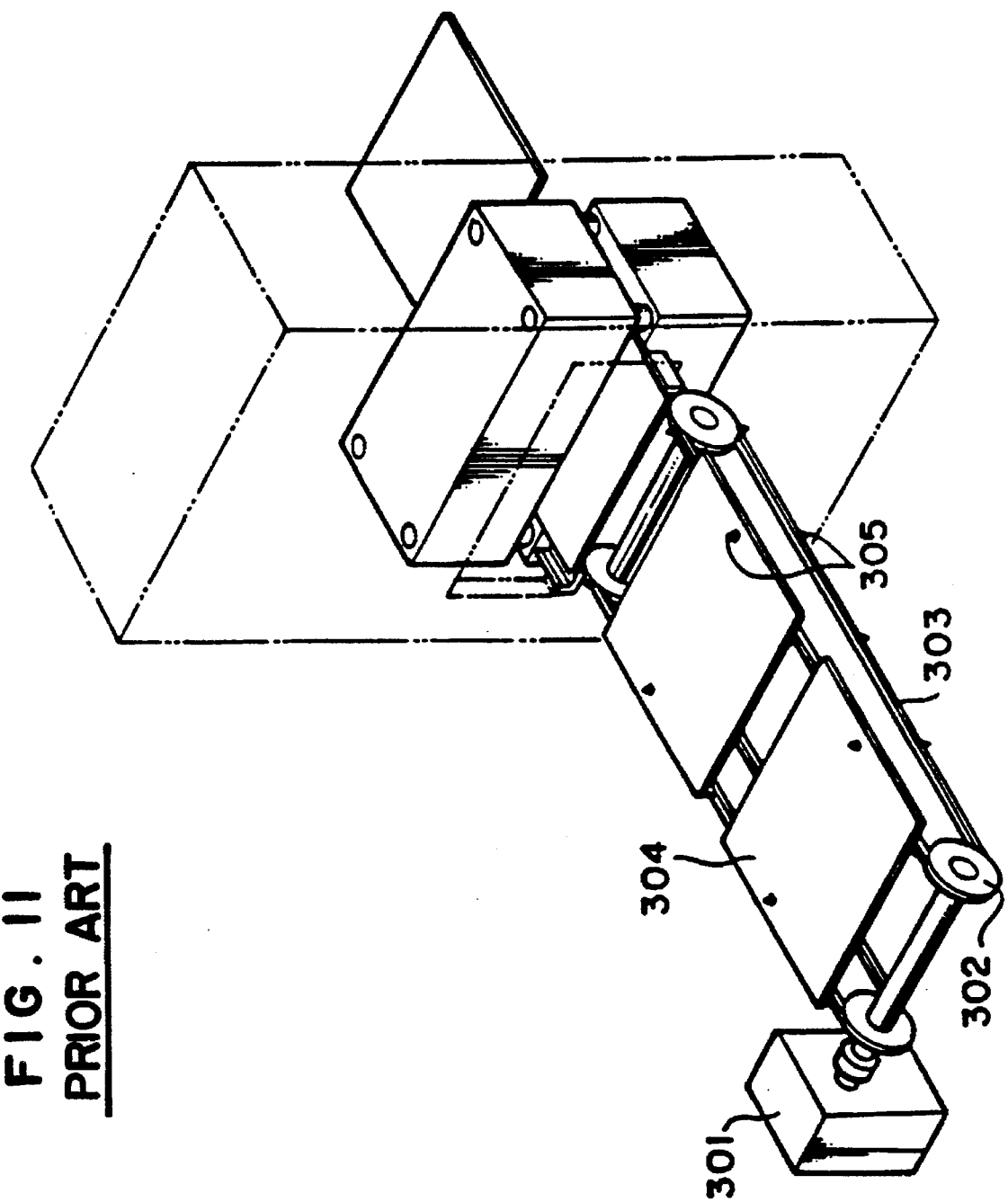
FIG. 11 is a perspective view schematically showing a prior art of a material feeding apparatus for sheet materials.

Next, one embodiment for sheet materials having a relatively large width will be described with reference to FIG. 8. This embodiment is different from the structure shown in FIG. 1 in that material feeding apparatuses are provided on both a material introducing portion on the front side and a material discharging portion on the rear side of a press machine 100. The material feeding apparatus on the front side of the press machine 100 (upstream in the material conveyance direction) comprises a pair of right and left gripper feeds 101A, 102A similar to those in FIG. 1, and the material feeding apparatus on the rear side of the press machine 100 (downstream in the material conveyance direction) likewise comprises a pair of right and left gripper feeds 101B, 102B. The front gripper feeds 101A, 102A and the rear gripper feeds 101B, 102B are provided symmetrically with each other. More specifically, first gripper means 104A of the front gripper feeds 101A, 102A and first gripper means 104B of the rear gripper feeds 101B, 102B are located closer to the press machine 100 whereas second gripper means 105A of the front gripper feeds 101A, 102A and second gripper means 105B of the rear gripper feeds 101B, 102B are located away from the press machine 100. A motive power transmission system 107A to 112A (i.e. 107A, 108A, 109A, 110A, 111A, and 112A) of the gripper means 104A, 105A of the front gripper feeds 101A, 102A and a motive power transmission system 107B to 112B (i.e. 107B, 108B, 109B, 110B, 111B, and 112B) of the gripper means 104B, 105B of the rear gripper feeds 101B, 102B are provided on the front and rear sides of the press machine 100 symmetrically and coaxially with each other, and driven by a common crankshaft 113. Therefore, when the crankshaft 113 of the press machine 100 drives a die 114 through connecting rods and slides so as to press-work a sheet material 115, the front gripper feeds 101A, 102A and the rear gripper feeds 101B, 102B are operated in complete synchronism with each other. Each of the gripper feeds 101A, 102A, 101B, 102B has the same structure as shown in FIGS. 2 to 5.

The operation of this embodiment will now be described with reference to FIGS. 9a–d similarly to FIGS. 7A–D. First, at a timing a, a second stationary gripper 4 and a second movable gripper 5 of the front gripper feed which have released a sheet material 7B are returned to a conveyance start position, and the second movable gripper 5 is raised to clamp a trailing portion of the sheet material 7B, and subsequently, a first movable gripper 2 is lowered. Similarly, in the rear gripper feed, a second stationary gripper 4 and a second movable gripper 5 which have released a preceding sheet material 7A are returned to a conveyance start position, and the second movable gripper 5 is raised to clamp a trailing portion of the sheet material 7A, and subsequently, a first movable gripper 2 is lowered. At the next timing b, after the second stationary and movable grippers 4 and 5 clamping the sheet material 7B in the front gripper feed have moved to a conveyance finish position and fed the sheet material 7B by a length corresponding to a distance of the movement of these grippers, the first movable gripper 2 is raised, and the trailing portion of the sheet material 7B is clamped between a first stationary gripper 1 and the first movable gripper 2. Likewise, in the rear gripper feed, after the second stationary and movable grippers 4 and 5 clamping the preceding sheet material 7A have moved to a conveyance finish position and fed the sheet material 7A by a length corresponding to a distance of the movement of these grippers, the first movable gripper 2 is raised, and a leading portion of the sheet material 7B is clamped between a first stationary gripper 1 and the first movable gripper 2. At a timing c, after the second movable gripper 5 of the front gripper feed has been lowered to release the trailing portion of the sheet material 7B, the second movable gripper 5 is returned to the conveyance start position and raised to clamp a leading portion of the following sheet material 7C, and subsequently, the first movable gripper 2 is lowered. Similarly, in the rear gripper feed, the second stationary and movable grippers 4 and 5 which have released the sheet material 7A are returned to the conveyance start position, and the second movable gripper 5 is raised to clamp the leading portion of the sheet material 7B, and subsequently, the first movable gripper 2 is lowered. At the next timing d, after the second stationary and movable grippers 4 and 5 clamping the sheet material 7C in the front gripper feed have moved to the conveyance finish position and fed the sheet material 7C by a length corresponding to a distance of the movement of these grippers, the first movable gripper 2 is raised, and the sheet material 7C is clamped between the first stationary and movable grippers 1 and 2. Likewise, in the rear gripper feed, after the second stationary and movable grippers 4 and 5 clamping the sheet material 7B have moved to the conveyance finish position and fed the sheet material 7B by a length corresponding to a distance of the movement of these grippers, the first movable gripper 2 is raised, and the sheet material 7B is clamped between the first stationary and movable grippers 1 and 2. By repeating the above-described cycle, the sheet materials are fed intermittently by a predetermined length at a time.

According to the present invention, as has been described heretofore, a continuous strip material from a coil which has a relatively large width can be clamped at both the right and left sides and fed into the working machine, so that the space for the apparatus can be reduced. The pair of right and left gripper feeds are separated from each other to allow the operator to stand therebetween and to perform the die maintenance easily. The shape and surface accuracy of the grips is improved not to damage the material. Moreover, since the pair of right and left gripper feeds are actuated synchronously by the cam means, high-speed feeding operation can be performed with high accuracy. Furthermore, when pairs of gripper feeds are provided both upstream and downstream of the working machine in the material conveyance direction, sheet materials of a relatively large width can be fed similarly.

What is claimed is:

1. A material feeding apparatus for conveying a material having a relatively large width into a working machine intermittently, said apparatus including a pair of gripper feeds which are provided on both the right and left sides of a material introducing portion of the working machine and actuated synchronously, said gripper feeds each comprising:

first gripper means fixed along the associated right or left side of the material introducing portion and including a stationary gripper and a movable gripper which can clamp and release the material generally along the edge of the material at the associated side;

second gripper means located along the associated right or left side of the material introducing portion and supported for reciprocating movement along a direction of material conveyance towards and away from said first gripper means, said second gripper means having a stationary gripper and a movable gripper which can clamp and release the material generally along the edge of the material at the associated side; and a pair of cam means each operatively associated with one of said first and second gripper means for repeating such operations that, when said second gripper means clamp the material at a conveyance start position, said first gripper means release the material, and when said second gripper means move to a conveyance finish position, said first gripper means clamp the material while the second gripper means release the material and return to the conveyance start position, said gripper feeds including reciprocating means operable for moving said second gripper means towards and away from said first gripper means, said reciprocating means comprising separately operable structures located on the right and left sides of the material introducing portion of the working machine whereby the area between said gripper feeds at the material introducing portion is generally open.

2. A material feeding apparatus according to claim 1, wherein a second pair of gripper feeds is provided on a material discharging portion on the side of the working machine opposite the material introducing portion, said second pair of gripper feeds located on the right and left sides of the material discharging portion whereby the area between said second pair of gripper feeds at the material discharging portion is generally open, and means are provided for synchronizing operations of the first and second pairs of gripper feeds with each other.

3. A material feeding apparatus according to claim 1, wherein said gripper feeds each includes first gripper operating means having a first actuator which is movable between a clamping position for moving the movable gripper close to the stationary gripper and a releasing position for moving the movable gripper away from the stationary gripper in said first gripper means, and second gripper operating means having a second actuator which is movable between a clamping position for moving the movable gripper close to the stationary gripper and a releasing position for moving the movable gripper away from the stationary gripper in said second gripper means.

4. A material feeding apparatus according to claim 2, wherein said first and second pairs of gripper feeds each includes first gripper operating means having a first actuator which is movable between a clamping position for moving the movable gripper close to the stationary gripper and a releasing position for moving the movable gripper away from the stationary gripper in said first gripper means, and second gripper operating means having a second actuator which is movable between a clamping position for moving the movable gripper close to the stationary gripper and a releasing position for moving the movable gripper away from the stationary gripper in said second gripper means.

5. A material feeding apparatus according to claim 1, wherein a second pair of gripper feeds is provided on a material discharging portion on the side of the working machine opposite the material introducing portion, said second pair of gripper feeds located on the right and left sides of the material discharging portion whereby the area between said second pair of gripper feeds at the material discharging portion is generally open, said second pair of gripper feeds each including stationary first gripper means, a movable second gripper means and a second reciprocating means operable for moving said second gripper means of said second pair of gripper feeds towards and away from said first gripper means of said second pair of gripper feeds, said second reciprocating means comprising a separately operable structure located on the right and left sides of the material discharging portion of the working machine for each of said second pair of gripper feeds whereby the area between said second pair of gripper feeds at the material discharging portion is generally open, and means for operatively synchronizing the operation of the first and second pairs of gripper feeds with each other including said first and second reciprocating means whereby said first and second pairs of gripper feeds are operative to move the material through the working machine in unison.

* * * * *